March 1, 1927.

C. DORN 1,619,104

DOUGH DIVIDING MACHINE

Filed May 29, 1926    2 Sheets-Sheet 1

Inventor:
Carl Dorn.

March 1, 1927.
C. DORN
1,619,104
DOUGH DIVIDING MACHINE
Filed May 29, 1926      2 Sheets-Sheet 2
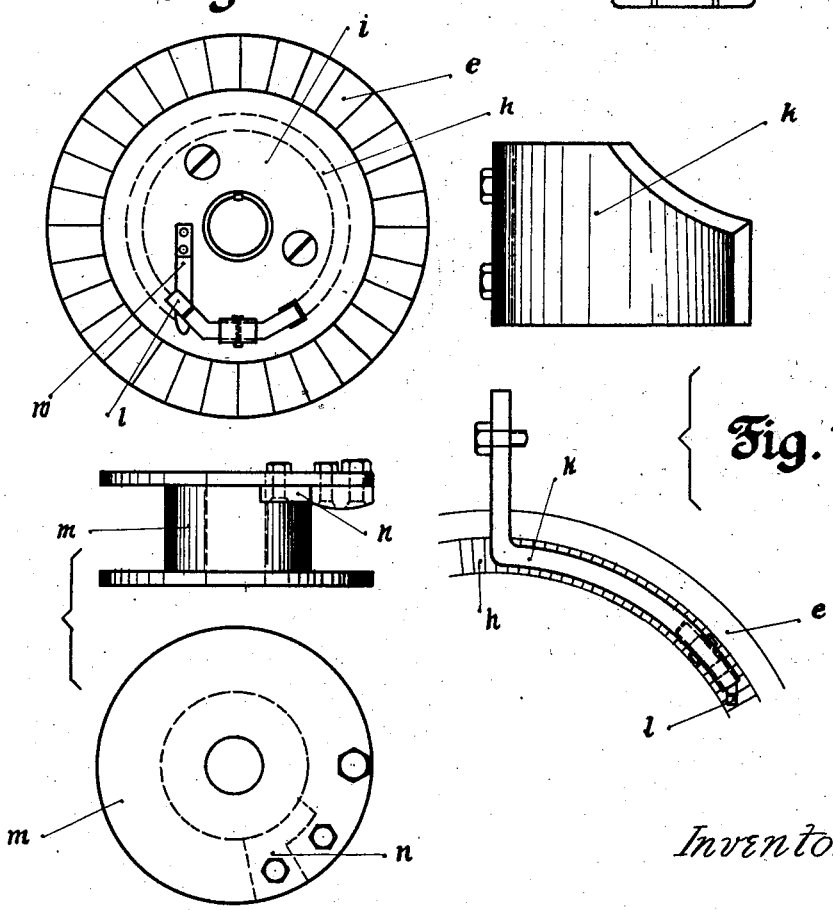
Inventor:
Carl Dorn.

Patented Mar. 1, 1927.

1,619,104

UNITED STATES PATENT OFFICE.

CARL DORN, OF HALLE-ON-THE-SAALE, GERMANY.

DOUGH-DIVIDING MACHINE.

Application filed May 29, 1926, Serial No. 112,607, and in Germany May 17, 1924.

This invention relates to a device for dividing into sections a dough rod which is extruded in a downward direction from a hopper, and the invention consists in the combination with a vertical spindle fitted with a fly-cutter of a driving gear with which said spindle is normally in loose frictional engagement so that the spindle can be arrested by a catch controlled by a lever system which is operated by the extruded dough for releasing the spindle, means being provided for engaging the spindle positively to the driving gear while the cutter passes across and divides the dough rod.

By this arrangement the spindle will be operated without shocks and the dough rod can be divided into uniform sections of any desired weight.

Figure 1:
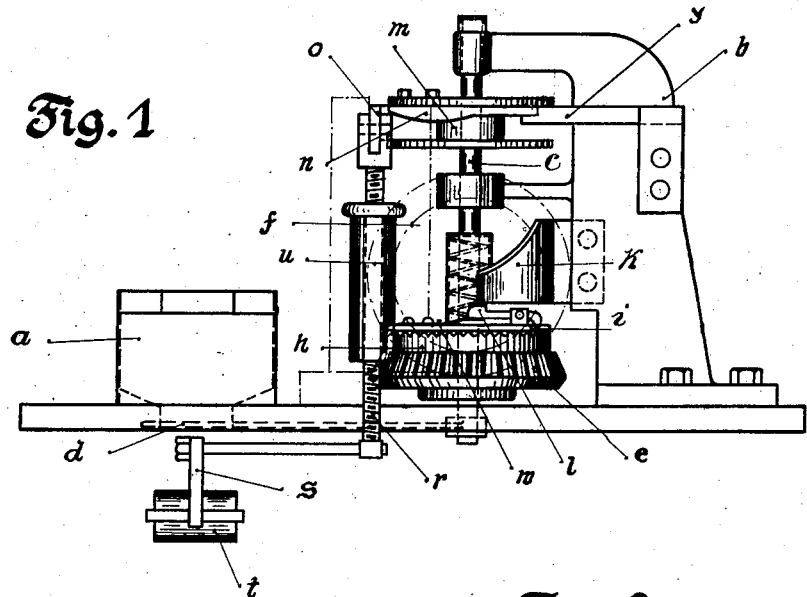
Figure 2:
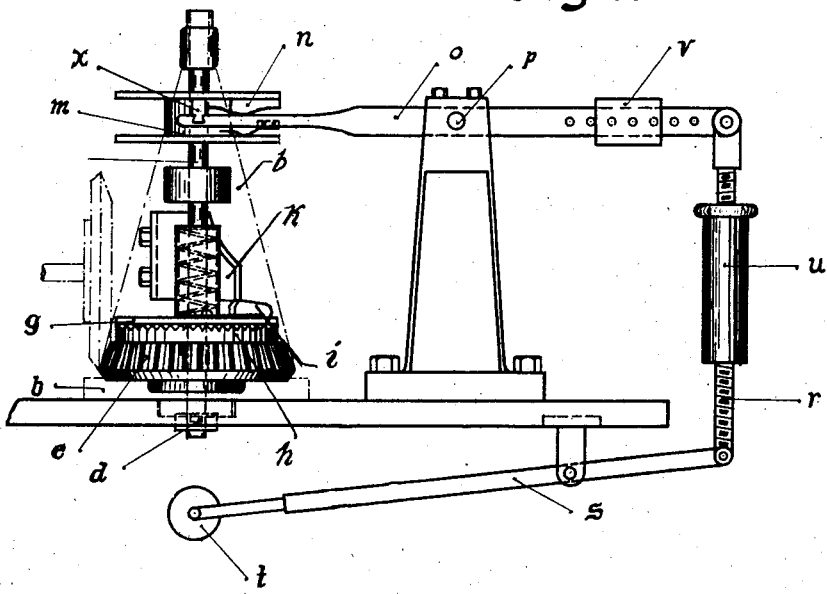

Figs. 1 and 2 of the accompanying drawings represent views at right angles of the device, Fig. 3, a sectional view of the gear elements, Fig. 4, an elevation of the same in disassembled position, Fig. 5, a plan of the gear elements, Fig. 6, a side view and a plan of one of the spindle accessories, and Fig. 7, a side view and a plan of one of the gear operating elements.

The dough is extruded in a downward direction from a hopper $a$, and the extruded dough rod is divided into sections by means of a revolving fly-cutter $d$ passing across the discharge orifice of the hopper. The cutter is secured to a spindle $c$ which is held in a vertical position in the machine frame $b$. A bevelled gear wheel $e$ which is loosely arranged on the spindle, receives continuous rotation from a driving wheel $f$. The wheel $e$ is released for the reception of a sleeve $g$ which is slidably feathered on the spindle and which has at its lower end a tapered rim whereby it bears by gravity or spring pressure against a correspondingly shaped face at the bottom of the wheel recess. The sleeve $g$ acts as a friction clutch and transmits the motion of the wheel to the spindle $c$ so long as the latter is unrestrained by external elements.

The sleeve $g$ can also be positively engaged with the wheel $e$ for which purpose the latter is formed with a ring of ratchet teeth $h$ for engagement with a pawl $l$ connected to the sleeve. The pawl is rockingly mounted on a flange $i$ on the sleeve and is supported by a spring $w$ which tends to force the active end of the pawl through a slot in the flange into engagement with the ratchet teeth $h$. This is prevented in one position of the sleeve and of the spindle by a curved bracket $k$ which is secured to the machine frame so as to be in the path of the pawl and so as to engage and depress the spring-actuated end of the latter.

There is a lever system composed of two substantially parallel double-armed levers $o$ and $s$ which are held by trunnions $p$ in the machine frame and which are connected at one end by a link $r$. The free end of the lever $o$ is situated between two flanges on a boss $m$ which is rigidly secured to the spindle $c$. It has a lug $x$ which is normally held, owing to the action of an adjustable weight $v$ on the opposite lever arm, against the upper flange and in the path of a lug $n$ connected to the latter. When the pawl $l$ is in engagement with the bracket $k$, the lug $n$ is normally in engagement with the lug $x$ so that the spindle is prevented from moving. The free end of the lever $s$ carries a roller $t$ which is situated under the discharge orifice of the hopper $a$ so as to take the thrust of the extruded dough rod. The distance of the roller $t$ from the discharge orifice of the hopper can be varied by an adjustment of the link $r$ which is divided into two portions threaded right and left hand respectively and connected by an adjusting sleeve $u$.

A spring $y$ is arranged so as to engage the lug $n$ and prevent retrograde movement of the spindle.

The action is as follows:

When the dough rod which is extruded against the roller $t$ attains a certain weight, the lever system is operated so as to disengage the lugs $x$ and $n$ from each other. The spindle will then be set in motion by the frictional engagement of the wheel $e$ with the sleeve $g$, the starting being gradual and without shocks. As soon as the pawl $l$ has moved out of engagement with the bracket $k$, it drops into engagement with the toothed ring $h$, and the spindle will then be positively rotated while the cutter passes through the dough rod and separates off the extruded dough section. The latter, on being detached, is discharged by the roller $t$ whereupon the lever system is restored to its initial position so that, as the pawl $l$ passes under the bracket $k$ and as the lug $n$ strikes against the lug $x$, the spindle will be arrested. When the roller $t$ is depressed by the next dough section, the process will be repeated.

By an adjustment of the weight $v$ on the lever $o$ and by an appropriate distancing of the roller $t$ from the hopper, uniform dough sections of any desired weight can be divided off in this manner.

I claim:

1. In a dough dividing machine, the combination with a hopper adapted to extrude a downwardly directed dough rod and with a vertical spindle having a fly-cutter for dividing said rod in sections, of a continuously rotated gear wheel mounted loosely on said spindle, a clutch element on the spindle engaging said gear wheel so as to impart rotation to the spindle when the latter is unrestrained, means for arresting the spindle, means for releasing the spindle by the gravital action of the extruded dough rod, and means for coupling the spindle positively to the gear wheel while the cutter passes across and divides the dough rod.

2. A structure as claimed in claim 1 wherein the means for arresting and releasing the spindle consists of a weight-balanced lever system.

3. A structure as claimed in claim 1 wherein the means for arresting and releasing the spindle consists of two substantially parallel double-armed levers, an adjustable link connecting the levers at one end, means at the free end of one of said levers for arresting the spindle, an adjustable weight on the lever tending to hold said arresting means in operative position, and a roller connected to the free end of the other lever, said roller being situated so as to be acted upon by the weight of the extruded rod for turning the levers so as to shift said arresting means out of operative position.

4. A structure as claimed in claim 1 wherein the means for engaging the spindle positively with the gear wheel consists of a pawl and ratchet mechanism, and a rigidly supported bracket arranged so as to co-operate with the pawl for putting said arresting mechanism out of operation in one position of the spindle.

CARL DORN.